(12) United States Patent
Re et al.

(10) Patent No.: US 8,961,026 B2
(45) Date of Patent: Feb. 24, 2015

(54) FLANGED BEARING RING FOR A MOTOR VEHICLE WHEEL BEARING UNIT

(75) Inventors: Paolo A Re, Nichelino (IT); Cornelius Petrus Antonius Vissers, Den Dungen (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/634,668

(22) PCT Filed: Apr. 15, 2010

(86) PCT No.: PCT/EP2010/054971
§ 371 (c)(1),
(2), (4) Date: Nov. 16, 2012

(87) PCT Pub. No.: WO2011/127979
PCT Pub. Date: Oct. 20, 2011

(65) Prior Publication Data
US 2013/0136385 A1 May 30, 2013

(51) Int. Cl.
*F16C 13/00* (2006.01)
*F16C 33/62* (2006.01)
*F16C 33/60* (2006.01)
*F16C 33/58* (2006.01)
*F16C 33/64* (2006.01)
*F16C 19/38* (2006.01)

(52) U.S. Cl.
CPC ............. *F16C 33/583* (2013.01); *F16C 33/60* (2013.01); *F16C 2326/02* (2013.01); *F16C 33/64* (2013.01); *F16C 19/386* (2013.01)
USPC .......................................... 384/544; 384/492

(58) Field of Classification Search
USPC ......... 384/492, 513, 537, 543, 544, 584, 586, 384/589; 301/105.1
See application file for complete search history.

(56) References Cited

U.S. PATENT DOCUMENTS

| | | | |
|---|---|---|---|
| 2,506,278 A * | 5/1950 | Ristow | 384/584 |
| 3,938,864 A | 2/1976 | Haussels | |
| 5,079,825 A * | 1/1992 | Matsui et al. | 29/520 |
| 6,485,188 B1 * | 11/2002 | Dougherty | 384/589 |
| 8,469,598 B2 * | 6/2013 | Vissers et al. | 384/544 |
| 2011/0255818 A1 * | 10/2011 | Vissers et al. | 384/537 |
| 2011/0255819 A1 * | 10/2011 | Vissers et al. | 384/564 |

FOREIGN PATENT DOCUMENTS

| | | |
|---|---|---|
| DE | 19918351 A1 | 10/2000 |
| DE | 10061663 A1 | 6/2002 |
| EP | 1830097 A1 | 9/2007 |
| GB | 1510546 | * 10/1975 |
| GB | 1510546 A | 5/1978 |
| WO | 2008147284 A1 | 12/2008 |
| WO | 2010012283 A1 | 2/2010 |
| WO | 2010012284 A1 | 2/2010 |

* cited by examiner

*Primary Examiner* — James Pilkington
(74) *Attorney, Agent, or Firm* — Bryan Peckjian; SKF USA Inc. Patent Dept.

(57) ABSTRACT

A flanged bearing ring is made up of two different materials joined together as a single piece, namely a radially inner annular insert and a flanged, radially outer lightweight body formed around the insert. The insert forms one or more raceways and is made of a hard material, such as bearing steel. The outer body is made of a lightweight material, such as aluminium alloy, with a higher thermal expansion coefficient higher than that of the hard material which the inner insert is made of. A relief formed by the insert extends into a groove of the outer body. Another relief, formed by the outer body, extends into a further groove of the insert. These reliefs and grooves interlock the insert and the outer body together against relative movement under all temperature conditions.

18 Claims, 4 Drawing Sheets

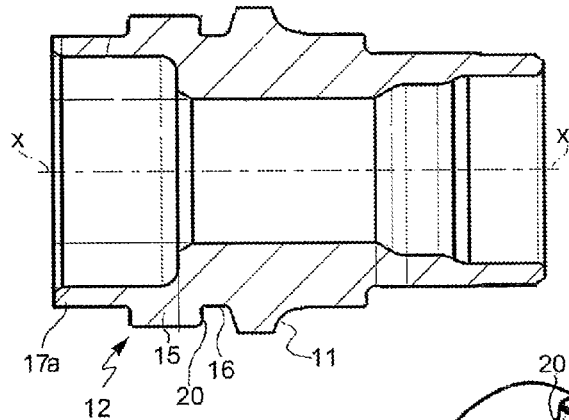
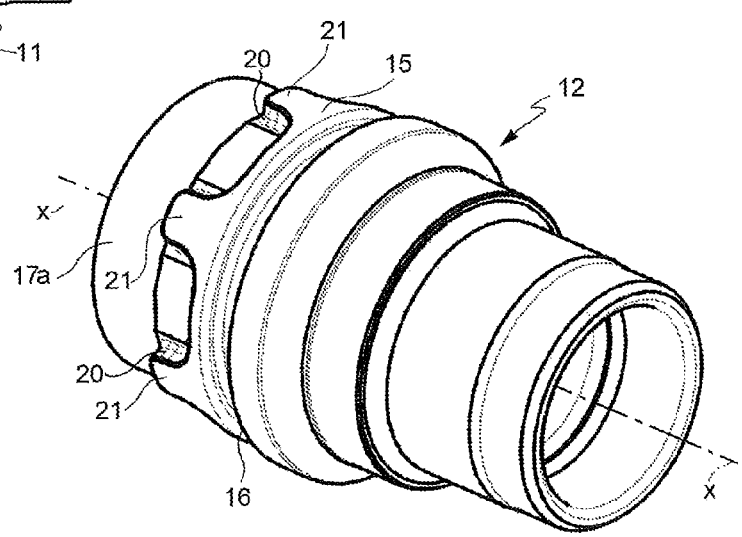
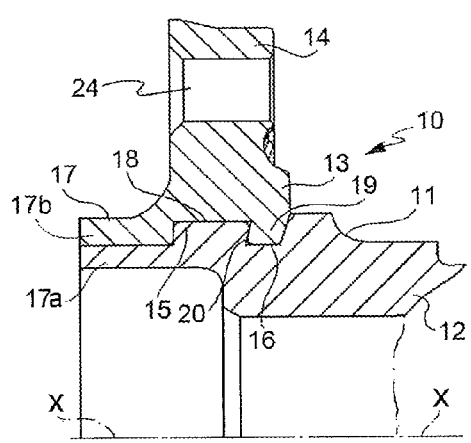
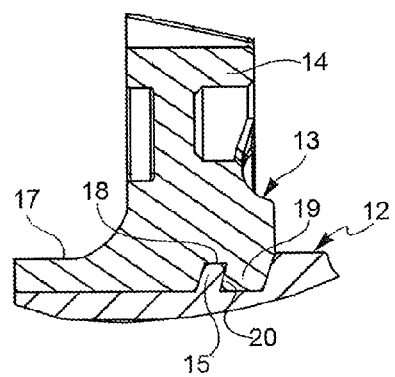
Fig.3
Fig.4
Fig.1
Fig.2

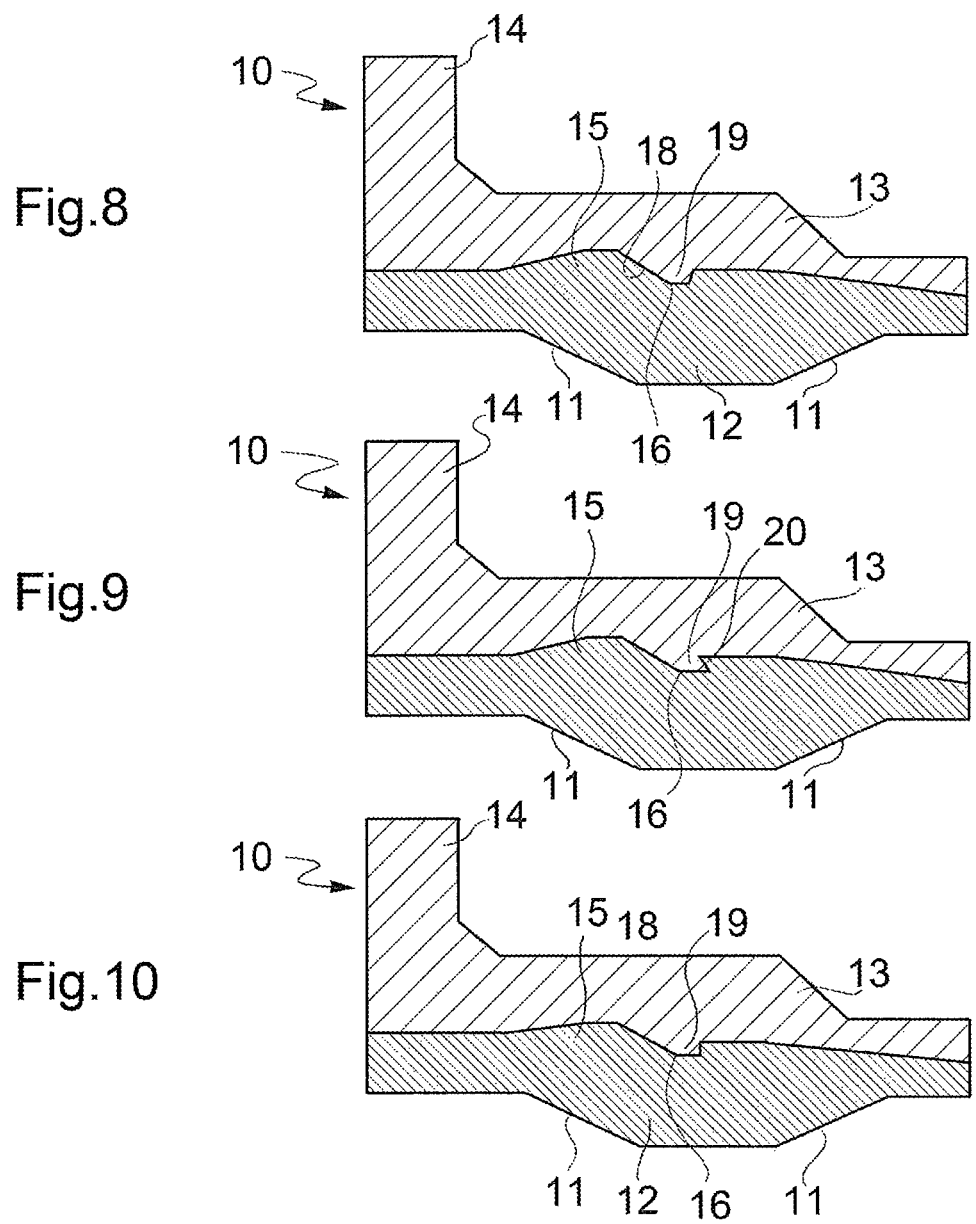

FLANGED BEARING RING FOR A MOTOR VEHICLE WHEEL BEARING UNIT

CROSS-REFERENCE

This application is the US national stage of International Application No. PCT/EP2010/054971 filed on Apr. 15, 2010.

FIELD OF THE INVENTION

The present invention relates to a lightweight, flanged bearing ring for the hub of a motor vehicle wheel. The bearing ring may either be a stationary ring with a flange for mounting the relevant hub-bearing unit to the suspension standard of a motor vehicle, or a rotatable ring where the flange provides connection to the wheel and/or the brake rotor.

BACKGROUND ART

In order to comply with an ever increasing demand for weight reduction in motor vehicle components for the sake of cutting down fuel consumption and exhaust emissions. With a vehicle wheel bearing, weight reduction may not imply any reduction in strength and safety. The raceways must be made of a material hard enough to resist the stresses of rolling contact. Conventional bearing steel is still widely used, although other materials have been proposed, such as ceramics and titanium, which provide a good mechanical performance but are considerably more expensive as compared to bearing steel.

WO 2008/147284 A1 discloses a bearing ring made up of two different materials joined together in a single piece, namely a first, high toughness material such as bearing steel forming the raceways and a second, lightweight material, such as a lightweight metal, forming the rest of the ring. The second material is joined to the first material by a semi-solid casting process.

SUMMARY OF THE INVENTION

It is an object of the present invention to improve the connection between the two different portions of a flanged bearing ring made of two different materials, namely a first, hard material and a second, lightweight material. Particularly, it is desired to improve such a connection under all temperature conditions, that is, at high temperature operational conditions as well as in freezing conditions.

The present invention is directed to a flanged bearing ring for a motor vehicle wheel that provides improvements in the key areas of bearing ring performance. That is, the bearing ring of the invention provides a lower weight, while ensuring the required high strength capabilities. The ring is made up of two different materials joined together as a single piece, and includes a radially inner, annular or tubular insert, and a radially outer body formed around the insert. The insert forms one or more raceways and is made of a hard material with a first thermal expansion coefficient. The outer body provides a radially outwardly extending flange and is made of a lightweight material with a second thermal expansion coefficient higher than that of the first material. Interlocking means, formed by the insert and the outer body, lock these two bodies together against relative axial movement. The interlocking means include one or more radially recessed portions and one or more radially protruding portions at an outer surface of the insert. Respective, complementary radially protruding portions and radially recessed portions are formed by the outer body, thereby preventing axial movement between the outer body and the inner insert either at high or low temperatures. Preferably, these mating protrusions and recesses at the interface between the outer body and the inner insert are so shaped as also prevent relative rotary movement between the outer body and the inner insert.

One aspect of the invention comprises a flanged bearing ring for a motor vehicle wheel formed of two different materials joined together as a single piece. The ring includes a radially inner, annular or tubular insert which forms at least one raceway around a central axis of rotation, includes a radially outer surface, and is made of a first material with a first thermal expansion coefficient. The ring also includes a radially outer body forming a radially outwardly extending flange around the insert that is made of a second material lighter than the first material and that has a second thermal expansion coefficient higher than the first thermal expansion coefficient. The insert includes a first protrusion extending into a first recess in the outer body, and the outer body includes a second protrusion extending into a second recess in the insert. In addition, an axial midpoint of the first protrusion is axially spaced from an axial midpoint of the second protrusion. A side wall of the first protrusion may form a side wall of the second recess.

Other features and advantages of the invention will become apparent to those skilled in the art upon review of the following detailed description, claims and drawings in which like numerals are used to designate like features.

BRIEF DESCRIPTION OF THE DRAWINGS

In order that the present invention may be well understood there will now be described a few preferred embodiments thereof, given by way of example, reference being made to the accompanying drawings, in which:

FIG. 1 is a partial axial cross-sectional view of a first embodiment of a bearing ring according to the invention;

FIG. 2 is a cross-sectional view taken along an axial plane angularly offset with respect to that if FIG. 1;

FIG. 3 is an axial cross-sectional view of a tubular insert comprised in the bearing ring of FIGS. 1 and 2;

FIG. 4 is a perspective view of the insert of FIG. 3;

FIGS. 8 to 12 are partial, axial cross-sectional views of bearing rings made in accordance with other different embodiments of the invention.

DETAILED DESCRIPTION

Figure 6:
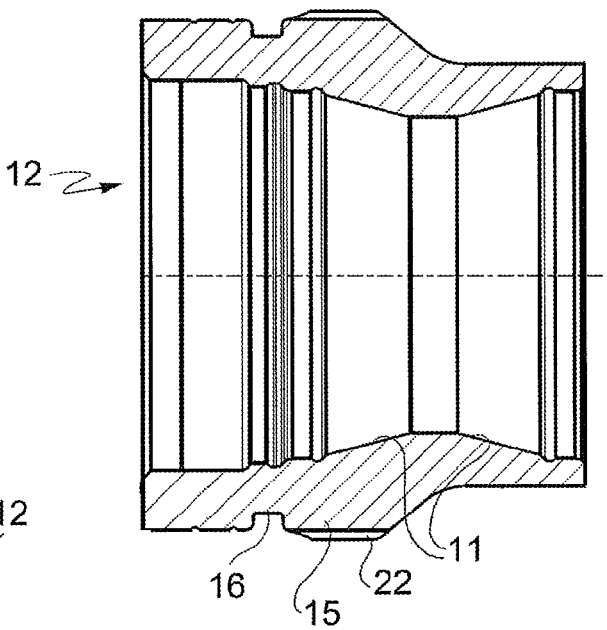
FIG. 6 is an axial cross-sectional view of an annular insert comprised in the bearing ring of FIG. 5.

Referring initially to FIGS. 1 to 4, designated overall at 10 is a flanged bearing ring in accordance with a first embodiment of the invention. The ring 10 in this example is designed for a double-row angular contact bearing for vehicle applications, particularly for mounting to a vehicle wheel (not shown) to be rotationally supported relative to a stationary suspension standard (not shown) of the vehicle. The bearing ring 10 provides a raceway 11 for a row of rolling elements, in this example a raceway for an outboard row of bearing balls.

The ring 10 comprises a radially inner insert 12 of generally annular or tubular shape and a radially outer body 13 providing a radially outwardly extending flange 14 near an outboard end of the insert 12. The flange 14 provides a number of through bores 24 to allow connection to the vehicle wheel by means of stud bolts. Although the bearing ring shown in FIGS. 1 to 4 is a radially inner bearing ring, the ring structure described below may also be used with other types of flanged bearing rings, for example a stationary, radially outer bearing ring with a radial flange for mounting to the suspension standard of the vehicle, or a rotatable, radially outer bearing ring the flange which is to be fixed to the wheel. Throughout the present description and the claims, terms and expressions indicating positions and directions such as "radial" and "axial" are understood as referring to the axis of rotation x of the bearing. Expressions such as "inboard" and "outboard" instead refer a condition when mounted on a vehicle.

The radially inner insert 12 is made of a first, hard material having a first, lower volumetric thermal expansion coefficient, whereas the radially outer body 13 is made of a second, lightweight material with a second, volumetric thermal expansion coefficient higher than that of the first material which the insert 12 is made of. Since the insert 12 forms one or more raceways, a hard and tough material suitable for the insert is, for example, a bearing grade steel. As alternatives, low carbon steel or ceramic may be used. As a lightweight material for the outer body 13, a lightweight metal is preferred, such as aluminium, magnesium, or alloys thereof. Other suitable materials for the outer body may include, but not be limited to, carbon composites or reinforced polymers.

The insert 12 is machined so as to form, in its radially outer surface, a radially protruding and circumferentially extending relief 15, and a radially recessed, circumferentially extending groove 16. The relief is defined by the fact that starting from its central portion it is always possible to find at least one close interval both on left and right side where the diameter is smaller than in the central portion. The groove is defined by the fact that starting from its central portion it is always possible to find at least one close interval both on left and right side where the diameter is greater than in the central portion. In a preferred embodiment, the relief 15 and the groove 16 extend circumferentially continuously about the outer surface of the insert. As better explained in the following, the relief 15 acts as a tongue in a first tongue and groove connecting means for preventing relative axial movement between the insert 12 and the outer body 13, especially over a first temperature range. The groove 16 is part of a second tongue and groove connecting means for preventing relative axial movement between the insert 12 and the outer body 13 over a second temperature range, neighbouring or partly overlapping the first range. To some extent, depending on the cross-sectional shape of the groove, this will also prevent radial movement between the insert and the outer body.

Preferably, the outer body 13 is formed and joined to the insert 12 through a semi-solid casting process, which is a near net shape process wherein the metal of the outer body is formed at a temperature between its liquidus and solidus. The advantage of a semi-solid casting process with respect to a molten metal process, such as high pressure die casting, is that the outer body obtains a denser, dendrite-free microstructure providing the strength and crack-propagation resistance required for bearing applications. Also, the semi-solid casting process allows the outer body to achieve accurately the required shape also in those instances where the surfaces at the interface between the insert 12 and the outer body 13 have a particularly complex shape, for example if undercuts are provided.

In the example of FIGS. 1-2, the flanged ring 10 has an axial tubular extension 17 at its outboard side, commonly known as a spigot, which facilitates centring of the vehicle wheel. The axial tubular extension 17 includes a tubular core portion 17a which is part of the insert 12 and a tubular covering portion 17b which completely covers the core portion 17a and is part of the outer body 13.

The wheel-mounting flange 14 and the outer surface of the spigot 17 can be formed with the necessary geometry to ensure sufficient stiffness. Moreover, the bores 24 in the wheel mounting flange 14 can be provided during the semi-solid casting process, by forming the semi-solid metal of the flange 14 around appropriately positioned threaded nuts or stud bolts.

A rheocasting process is one example of a preferred semi-solid casting process. Using aluminium as an example of the lightweight metal for the outer body 13, a rheocasting process initially involves bringing the aluminium to a molten (liquid) state. The molten aluminium is then allowed to cool and is stirred during solidification to obtain a semi-solid slurry. The step of cooling can involve adding solid particles of aluminium to the molten material and, for enhanced efficiency, the solid particles can be added via a stirring mechanism. An exchange of enthalpy takes place between the liquid aluminium and the solid particles, which facilitates the formation of the slurry and can dispense from the need for external cooling. The semi-solid aluminium slurry is then injection-moulded to the inner insert 12 with the aid of a suitable die that defines the required shape of the wheel mounting flange 14.

While it is preferred, as already indicated, to form the outer body 13 by a semi-solid casting process, in its broadest aspect the invention is not so limited and encompasses the possibility of sintering or casting, die-casting or otherwise forming the outer body about the inner insert 12.

As the second material of the outer body cools and solidifies, it shrinks. Basically, contraction occurs in a radially inward direction, towards the central axis of rotation x of the bearing unit. Thus, the semi-solid metal of the outer body 13 shrinks around the relief 15 of the insert and forms a groove 18 tightly copying the shape of this relief, so as to interlock together the outer body and the insert and, particularly, prevent any relative axial movement between the outer body and the insert. This interlocking action is fully effective at low and medium temperatures. It is to be noted that after cooling, the semi-solid metal that fills the groove 16 and forms a corresponding relief 19 will tend to shrink away from the walls of that groove. During use of the wheel bearing at low or medium temperatures, such shrinking could lead to the resulting relief 19 of the outer body being somewhat separated from the walls of the groove 16 in which it is accommodated. At these temperatures, relative movement between the outer body and the insert is prevented by the first tongue and groove connecting means 15, 18. Due to the nearness of the brakes, in harsh operation conditions considerable changes in dimension due to temperature are expected. In such an occurrence, the outer body 13 will expand more that the insert 12. As a result, the groove 18 will tend to separate from the relief 15. However, the relief or tongue 19 will expand more than the groove 16 in which it is seated, thereby taking away any possible axial play between the outer body and the insert.

The second tongue and groove connecting means 16, 19 may take a number of different shapes. In a less preferred embodiment (not shown), the groove 16 has a rectangular shape in a cross-section taken in an axial plane. In the preferred embodiment, the groove 16 forms an undercut 20, in order to provide a higher degree of interlock against relative movement between the outer body and the inner insert in a direction perpendicular to the axis of rotation x.

As will be appreciated, the binding action given by the two different tongue and groove connecting means are complementary in covering efficiently the whole range of temperatures a wheel bearing may encounter in use.

Figure 5:
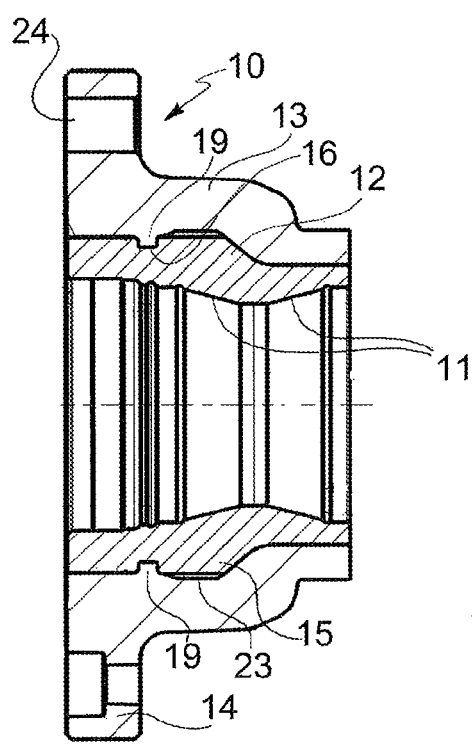
FIG. 5 is an axial cross-sectional view of a second embodiment of a bearing ring according to the invention.
Figure 7:
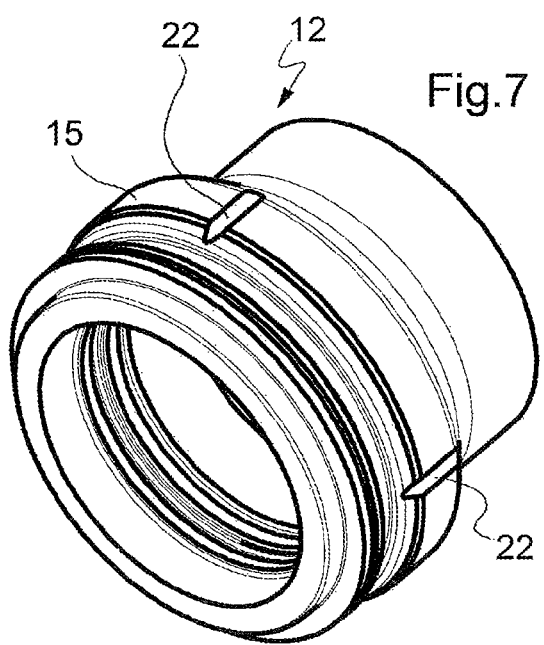
FIG. 7 is a perspective view of the insert of FIG. 6.

In a particularly preferred embodiment, in order to prevent relative rotary movement between the outer body 13 and the inner insert 12, part of the mating surfaces at the interface between the outer body and the inner insert are made so as to be non-cylindrical in a cross-section taken perpendicularly to the axis of rotation x. In the example of FIGS. 1-4, the relief 15 formed on the outer surface of the insert takes the shape of a crown, with a number of radially protruding projections 21 circumferentially spaced around the insert, so as to form corresponding or complementary radial recesses in the outer body, and thereby lock the outer body to the insert against relative rotary movement. In the embodiment shown in FIG. 4, undercuts 20 are formed at one or either side of each projection 21. As an alternative or in addition to those undercuts, further undercuts (not shown) may be formed where the relief 15 joins the tubular core portion 17a of the spigot. In another embodiment (not shown), the non-cylindrical mating surfaces at the interface between the outer body and the inner insert take a polygonal shape. In the illustrative embodiment of FIGS. 5 to 7, radial recesses or notches 22 are formed in the annular relief 15, so that the outer body will be formed with complementary protrusions 23 (FIG. 5). Several equivalent modifications of anti-rotation formations will become apparent to those skilled in the art. For example, in an alternative embodiment, circumferentially spaced radial notches may be formed within the groove 16. The embodiment of FIGS. 5-7 relates to an example wherein the flanged bearing ring is a stationary, radially outer ring which forms a pair of raceways 11 for tapered rolling elements intended for rotatably supporting an axle. The outer body 13 provides a flange 14 for mounting to a suspension standard (not shown).

Wheel bearing units in numerous designs can be executed in accordance with the invention. For example, the bore of the insert can serve as an outer raceway for rolling elements of a constant velocity joint and the unit can comprise an integral CV joint. Moreover, the bearing unit can be a single row or a double-row angular contact bearing in which the rolling elements are balls, rollers, flattened balls etc. Also, when the unit is a double-row bearing, the raceways for the first and second rows of rolling elements can be equal in diameter, or the diameter can differ.

Figure 11:
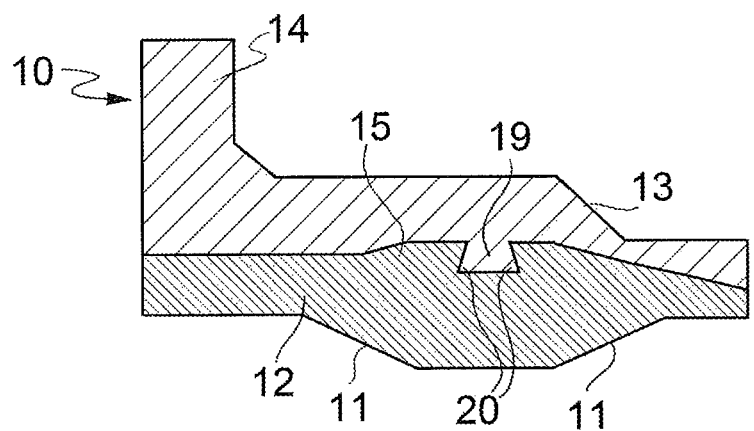
Figure 12:
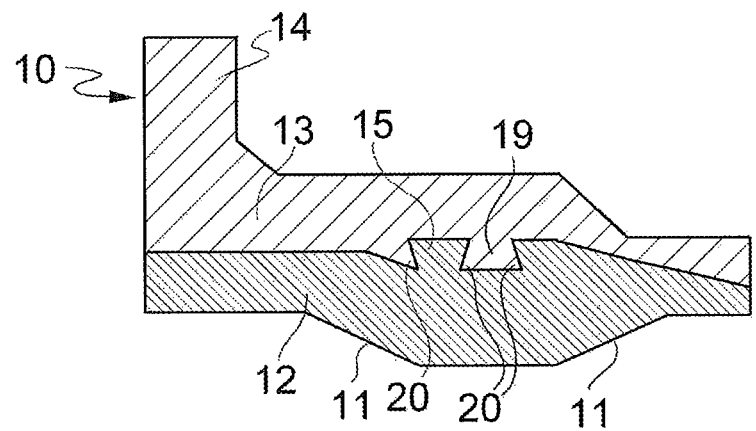

Further embodiments are schematically depicted in FIGS. 8 to 12. FIG. 8 shows an example of a groove 16 having two opposite conical surfaces at an obtuse angle, i.e. tapering towards each other. In the embodiment of FIG. 9, the groove 16 has two conical surfaces tapering in a same direction. The two conical surfaces are almost parallel or at an acute angle and one of them forms an undercut 20. In the embodiment of FIG. 10, the groove 16 has a conical surface and a radial surface at an acute angle. In the embodiment of FIG. 11, the groove 16 has two conical surfaces tapering in opposite directions, providing two undercuts 20. By virtue of this shape, the groove 16 and the relief 19 are shaped as a dovetail joint. In the embodiment of FIG. 12, both the reliefs 15, 19 and the mating grooves 16, 18 are shaped as dovetail joints.

While a few illustrative embodiments have been disclosed in the foregoing summary and detailed description, it should be appreciated that a vast number of variations exist. It should also be appreciated that the illustrative embodiments are only examples, and are not intended to limit the scope, applicability, or configuration in any way. Rather, the foregoing summary and detailed description will provide those skilled in the art with a convenient road map for implementing the invention, it being understood that various changes may be made in the function and arrangement of elements described in the exemplary embodiments without departing from the scope as set forth in the appended claims and their legal equivalents.

The invention claimed is:

1. A flanged bearing ring for a motor vehicle wheel, wherein the ring is made up of two different materials joined together as a single piece, the ring comprising:
    a radially inner, annular or tubular insert which forms at least one raceway around a central axis of rotation (x), provides a radially outer surface and is made of a first material with a first thermal expansion coefficient;
    a radially outer body forming a radially outwardly extending flange around the insert and made of a second material being lighter than the first material and having a second thermal expansion coefficient higher than that of the first material;
    interlocking means, formed by the insert and the outer body, locking them together against relative axial movement, said interlocking means including at least one radially recessed portion and at least one radially protruding portion at said outer surface of the insert, and respective, complementary radially protruding portion(s) and radially recessed portion(s) formed by the outer body in order to prevent axial movement between the outer body and the inner insert,
    wherein the protruding portion and the recessed portion extend circumferentially continuously about the outer surface of the insert.

2. A bearing ring according to claim 1, wherein the recessed portion formed in the insert provides an undercut to prevent relative movement between the outer body and the inner insert in a direction perpendicular to the axis of rotation (x).

3. A bearing ring according to claim 2, wherein the protruding portion and/or the recessed portion formed by the inner insert are shaped as a dovetail joint.

4. A bearing ring according to claim 1, wherein the protruding portion formed in the insert provides an undercut to prevent relative movement between the outer body and the inner insert in a direction perpendicular to the axis of rotation (x).

5. A bearing ring according to claim 1, wherein at least part of mating surfaces at the interface between the outer body and the inner insert are made so as to be non-cylindrical in a cross-section taken perpendicularly to the axis of rotation (x), in order to prevent relative rotary movement between the outer body and the inner insert.

6. A bearing ring according to claim 5, wherein the mating surfaces include a plurality of radially protruding projections and correspondingly shaped recesses circumferentially spaced around the axis of rotation (x).

7. A bearing ring according to claim 1, wherein the first material is one of a bearing grade steel, a low-carbon steel and a ceramics material.

8. A bearing ring according to claim 1, wherein the second material includes a metal.

9. A bearing ring according to claim 8, wherein the metal is aluminium, magnesium, or alloys thereof.

10. A bearing ring according to claim 8, wherein the radially outer body is formed from a metal material that is joined to the insert through a semi-solid casting process.

11. A bearing ring according to claim 10, wherein the semi-solid casting process is one of a thixoforming process, a thixocasting process, a thixoforging process, a thixojoining process, a rheoforming process, a rheocasting process, a rheoforging process, or a rheojoining process.

12. A bearing ring according to claim 1, wherein the radially outwardly extending flange extends from an outboard or axially outer end portion of the ring and is provided with connection means for allowing connection to a suspension of a vehicle.

13. A bearing ring according to claim 1, wherein a side wall of the at least one radially recessed portion of the insert forms a side wall of the at least one radially protruding portion of the insert.

14. A flanged bearing ring for a motor vehicle wheel formed of two different materials joined together as a single piece, the ring comprising:
- a radially inner, annular or tubular insert which forms at least one raceway around a central axis of rotation, includes a radially outer surface and is made of a first material with a first thermal expansion coefficient;
- a radially outer body forming a radially outwardly extending flange around the insert and made of a second material lighter than the first material and having a second thermal expansion coefficient higher than the first thermal expansion coefficient;
- wherein the insert includes a first protrusion extending into a first recess in the outer body, and wherein the outer body includes a second protrusion extending into a second recess in the insert, an axial midpoint of the first protrusion being axially spaced from an axial midpoint of the second protrusion, and wherein the first recess is circumferentially continuous.

15. A bearing ring according to claim 14, wherein the first recess is complementary to the first protrusion and the second recess is complementary to the second protrusion.

16. A bearing ring according to claim 14, wherein a side wall of the first protrusion forms a side wall of the second recess.

17. A bearing ring according to claim 14, wherein a side wall of the first protrusion forms a side wall of the second recess and a side wall of the second protrusion comprises a side wall of the first recess.

18. A bearing ring according to claim 14, wherein the first protrusion and the first recess form a first tongue and groove joint and the second protrusion and the second recess form a second tongue and groove joint.

* * * * *